United States Patent
Palmer et al.

(10) Patent No.: US 12,311,894 B1
(45) Date of Patent: May 27, 2025

(54) SYSTEM FOR RELOCATING VEHICLE SENSORS

(71) Applicant: DashLogic, Inc., Orem, UT (US)

(72) Inventors: Brian Palmer, Orem, UT (US); Weston Palmer, Pleasant Grove, UT (US)

(73) Assignee: Dashlogic, Inc., Orem, UT (US)

( * ) Notice: Subject to any disclaimer, the term of this patent is extended or adjusted under 35 U.S.C. 154(b) by 321 days.

(21) Appl. No.: 17/343,406

(22) Filed: Jun. 9, 2021

(51) Int. Cl.
| | |
|---|---|
| *B60S 5/00* | (2006.01) |
| *B60R 16/023* | (2006.01) |
| *G07C 5/02* | (2006.01) |
| *H04L 67/12* | (2022.01) |

(52) U.S. Cl.
CPC ............ *B60S 5/00* (2013.01); *B60R 16/0231* (2013.01); *G07C 5/02* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 11,053,871 B1 * | 7/2021 | Truax | F02D 41/18 |
| 2005/0251604 A1 * | 11/2005 | Gerig | H04L 69/326 |
| | | | 710/120 |
| 2009/0192694 A1 * | 7/2009 | Mullen | F02D 41/1454 |
| | | | 701/103 |
| 2016/0112216 A1 * | 4/2016 | Sargent | G07C 5/008 |
| | | | 370/328 |
| 2018/0148005 A1 * | 5/2018 | Haines | F02D 41/26 |
| 2020/0080506 A1 * | 3/2020 | Richter | G07C 5/0816 |

FOREIGN PATENT DOCUMENTS

WO   WO-2019049134 A1 * 3/2019 ............. G07C 5/008

* cited by examiner

*Primary Examiner* — Peter D Nolan
*Assistant Examiner* — Michael F Whalen
(74) *Attorney, Agent, or Firm* — ColterJennings

(57) ABSTRACT

A system for relocating a vehicle sensor comprises an aftermarket breakout device in electrical communication with one or more factory vehicle sensors, one or more vehicle electronic control modules, and/or one or more relocated vehicle sensors. The aftermarket breakout device monitors vehicle operating parameters, conditions, and other factory and/or relocated signal readings and corresponding electrical communications. The aftermarket breakout device modifies electrical communications going between one or more factory vehicle sensors and one or more vehicle control modules, wherein the modified electrical communications are received instead of the originally transmitted ones. The modified electrical communications may contain altered vehicle operating parameters, conditions, or sensor readings based on other factory and/or relocated signal readings.

15 Claims, 5 Drawing Sheets

SYSTEM FOR RELOCATING VEHICLE SENSORS

CROSS-REFERENCE TO RELATED APPLICATIONS

This application relates generally to the subject matter of U.S. Pat. No.
- U.S. Pat. No. 8,532,866 issued 10 Sep. 2013 for "Concurrent Vehicle Data Port Communication System";
- U.S. Pat. No. 8,881,038 issued 4 Nov. 2014 for "Method of Rendering Dynamic Vehicle Telemetry on a Graphical Display";
- U.S. Pat. No. 8,884,749 issued 11 Nov. 2014 for "Driver Information and Alerting System"; U.S. Pat. No. 8,897,952 issued 25 Nov. 2014 for "Vehicle Diagnostic Communications System and Application";
- U.S. Pat. No. 9,349,223 issued 24 May 2016 for "System for Advertising Vehicle Information Wirelessly";
- U.S. Pat. No. 9,481,288 issued 1 Nov. 2016 for "Driver Information and Alerting System"; U.S. Pat. No. 9,702,315 issued 11 Jul. 2017 for "System for Enhanced Vehicle Performance and Efficiency";
- U.S. Pat. No. 9,884,556 issued 6 Feb. 2018 for "Method of Rendering Dynamic Vehicle Telemetry on a Graphical Display"; and
- 10011213 issued 3 Jul. 2018 for "System for Enhanced Vehicle Performance and Efficiency";

the disclosures and the entire file histories of each of which are incorporated herein by this reference.

BACKGROUND

This disclosure relates generally to a method and system for modifying or altering factory vehicle electronic communications to or from factory sensors or signals, or other components, by way of the addition of aftermarket components, such as a relocated vehicle sensor, or an aftermarket breakout device in electrical communication with one or more vehicle control modules, and then altering those communications, for example, to relocate a factory vehicle sensor reading to use a sensor or signal in a different location within the vehicle.

Since at least model year 1996, every new passenger car and light-duty truck sold in the United States has had a computer diagnostic data connection port, such as an OBD1, OBD2/OBD-II, or SAE-J1962 port. Most heavy-duty trucks currently sold in the United States also include a computer diagnostic port, usually referred to as a J1708 port or a J1939 port. Some vehicles also include one or more additional data ports, sometimes located in the passenger compartment, the trunk, or the engine bay. These data ports permit a mechanic, vehicle operator, or other user to connect to the vehicle and retrieve vehicle diagnostic data and operating parameters, that is, data about the vehicle, including engine, fuel system, brake system, and other data, including various sensor signals.

Modern vehicles typically utilize many vehicle protocol data buses, some of which may be accessible via data ports. A vehicle protocol data bus that is not accessible via a data port (and thus would require hard-wiring, splicing, soldering, Y or T-harness, or other means of direct wired connection) is typically referred to as an isolated vehicle protocol data bus. In some vehicles, the manufacturer may incorporate gateway modules (that is, an electronic vehicle control module that can simultaneously communicate or act as a "gateway" between at least two different vehicle protocol data buses) to ensure that certain data is available to vehicle electronic control modules on other vehicle protocol data buses. These vehicle protocol data buses typically utilize CAN, J1850, ISO 9141, ISO 14230, KWP2000, ALDL, UART based, LIN, SENT, MOST, FlexRay, Ethernet, or some other communications protocol (or variant) as is known in the art.

Many companies also manufacture aftermarket flashing or tuning products that reprogram the vehicle engine control module with different calibrations, tables, curves, and other operating parameters such as spark or timing, fuel settings, shift points, temperature conditions, and other operating parameters and settings. Most systems of this kind are primarily designed to produce more horsepower, but some are advertised as useful to improve fuel economy or other aspects of the vehicle.

Often companies or consumers may make changes or modifications to their vehicle that require adding, removing, or adjusting vehicle parameters, signals, or other sensor data. These adjustments may be required to correct signals or data, to improve or correct the manner in which the engine controls operate. Sometimes these changes are made in conjunction with a new vehicle control module calibration (or flash/tune).

Some companies manufacture aftermarket supercharger or turbocharger kits, commonly requiring relocation (or "breakout") of factory sensors or signals to improve or correct readings that may differ after the addition of the aftermarket items. For example, when adding a supercharger, it is common to relocate the intake air temperature sensor signal (commonly known as IAT), from within the factory mass air flow or multifunction air sensor (generally in or near the airbox, where air will be colder) to a location after the supercharger compressor (or intercooler, if equipped), as the compressed intake air is typically much hotter before it actually enters the engine. Relocation of the IAT signal in this case restores accurate temperature readings to the factory vehicle control module, improving air density calculations, and thus vehicle emissions and ignition timing and control.

In the past, a new sensor could be installed simply by running the existing sensor harness to a new location, or re-routing a single signal wire from an existing sensor to a new location or new sensor. This often also required calibration of the vehicle control module receiving communication from this sensor, to correct the readings to be appropriate and accurate for the new type of sensor that has been installed.

Many modern vehicles have multifunction sensors, which combine multiple sensors or functions into a single unit, and are usually digital in nature (as opposed to analog sensors), and typically communicate with each other or with a vehicle control module using an isolated vehicle protocol data bus (such as LIN, SENT, UART, etc.) containing information from multiple types of sensors or signals on a single bus—often contained to just a single wire. This can save cost on manufacturing the vehicle, and may simplify assembly, installation, or servicing of these sensors or systems. With such digital multifunction sensors, unfortunately it is often no longer possible to reroute a single wire to correct or alter a single signal value as has been done in the past.

SUMMARY

The present disclosure provides an aftermarket breakout device that is attached to, connected to, plugged into, or in electrical communication with, one or more factory vehicle sensors, vehicle control modules, or relocated vehicle sensors. In a typical embodiment, the present breakout device is in electrical communication with a single vehicle control module, a single factory vehicle sensor, and a single additional relocated sensor. In such an embodiment, the breakout device intercepts the communications from the factory vehicle sensor, modifies those communications using signal data from the relocated vehicle sensor, and transmits the modified communications to the vehicle control module, such that the factory vehicle control module is not aware that it is not communicating with the original factory sensor. In some embodiments, the breakout device modifies only a portion of the communications, and may retransmit the remaining communications un-modified as required.

The present breakout device communicates using various protocols and signal levels, including, in some embodiments, a voltage signal, an amperage signal, a resistance signal, a frequency signal, an RF signal, an SPI protocol, an I2C protocol, a UART protocol, a J1850 protocol, a CAN protocol, a SENT protocol, a LIN protocol, a MOST protocol, or an Ethernet protocol. While monitoring an additional relocated sensor, or potentially other vehicle operating parameters or conditions, the present device can send communications, signals, or commands to a vehicle control module in place of a factory vehicle sensor.

The breakout device is designed to be used full time while the vehicle is operating and stays in constant communication with the factory vehicle systems. In some embodiments, the factory vehicle systems are not even aware that the aftermarket breakout device has replaced or altered communications, or that sensor or signal readings have been relocated.

The breakout device may include predetermined vehicle operating parameter limits and also permit the user to configure those limits or additional vehicle operating parameters or limits. The device then monitors the vehicle operating parameters and when a predetermined or pre-configured limit is exceeded, the breakout device may further modify communications or commands to the factory vehicle control module to create a desired change or correction in vehicle operating behavior. The breakout device may also include one or more peripheral input ports to acquire other data that can then be monitored and used as a configured limit. The breakout device may also include one or more peripheral output ports that enable voltage or communications signals to be output to another peripheral device or system, or even to another aftermarket vehicle component. The breakout device may include wireless and wired connections (such as USB, Bluetooth, WiFi, etc.) to allow the vehicle operator (or other user) to interface with a computer or mobile device, and perform data logging or configure the breakout device to customize features, settings, options, limits, or operating parameters.

BRIEF DESCRIPTION OF THE DRAWINGS

Other features and advantages of the present invention will be apparent from the following Detailed Description taken in conjunction with the accompanying Drawings, in which.

DETAILED DESCRIPTION

Modern vehicles typically have multiple vehicle systems with protocol data buses, some of which may be isolated, and at least one data port, such as an On-Board Diagnostics II port ("OBD-II port"). These data buses and data ports are used to communicate with the on-board electronic and diagnostics system of the vehicle, typically using a computing device or specialized hand-held OBD-II diagnostic appliance. According to the present disclosure, an aftermarket device communicates with one or more factory vehicle systems, sensors, or vehicle control modules, and one or more aftermarket relocated vehicle sensors, by way of being hard-wired, spliced, soldered, or other means of direct wired connection to a vehicle protocol data bus or communications or signal wire. In some embodiments, wireless communications protocols may be used for some or all of these communications. The breakout device monitors the vehicle operating parameters and conditions and modifies sensor readings or signals during communications with factory vehicle components.

Modern vehicles come equipped with numerous sensors and actuators. Many vehicles are starting to use "digital" sensors that communicate with a vehicle control module using an isolated vehicle protocol bus (such as LIN, SENT, CAN, etc), as opposed to a simple 0-5 Volt signal reading traditionally used (which generally used a single wire for only one reading). Examples include oil pressure sensors, oil temperature sensors, oil level sensors, mass air flow sensors, air pressure sensors, air temperature sensors, suspension height sensors, accelerometers, gyroscopes, fuel pressure sensors, and others.

These digital sensors can sometimes share a single housing, and often a single communication wire, for multiple different sensors or readings. This makes it difficult to alter signals, relocate or move a sensor, or correct sensor readings after the vehicle has been modified in a way where this would be beneficial or required. An example of this is an air sensor that combines readings for mass air flow, air humidity, air pressure, and air temperature into a single housing with a single communication wire.

Figure 1:
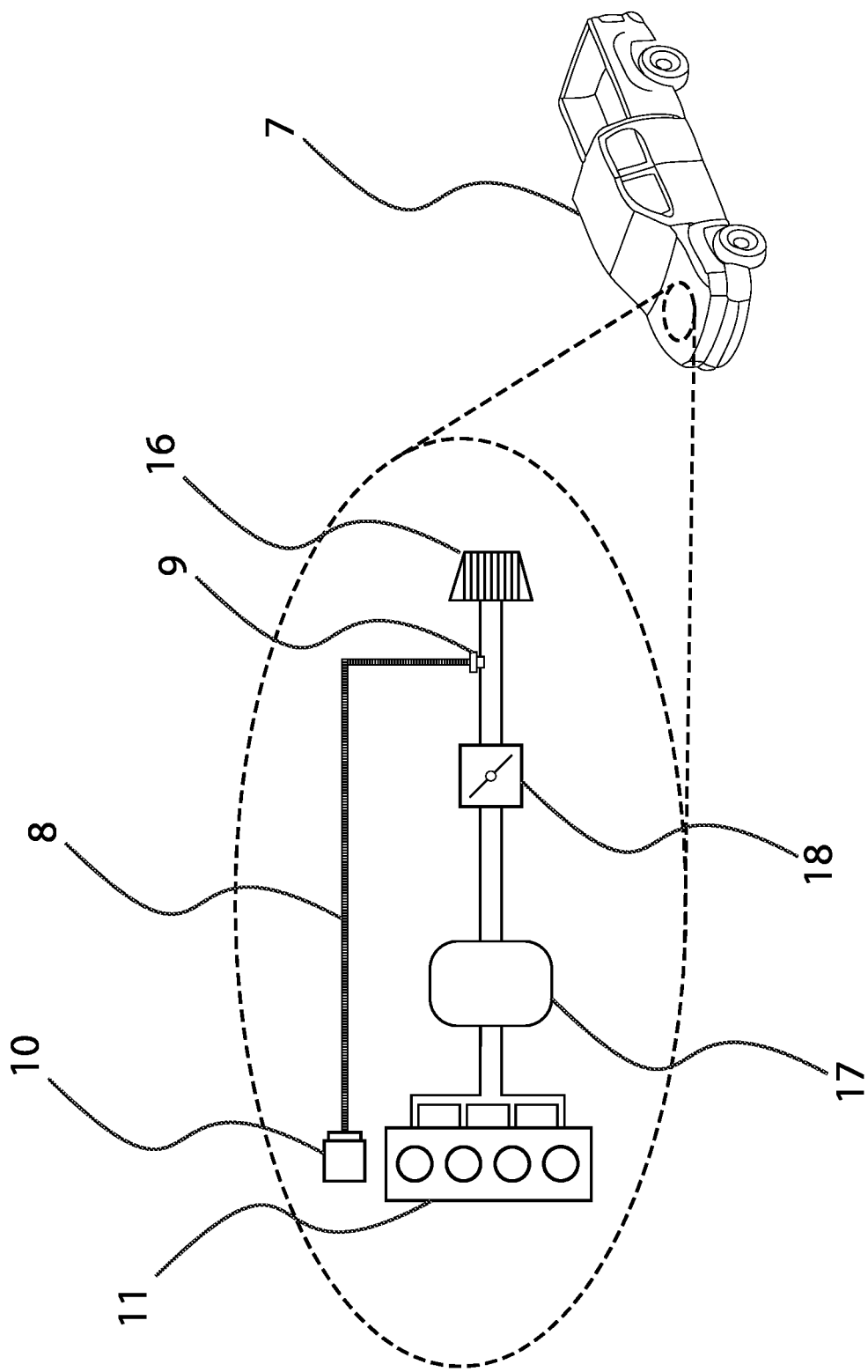
FIG. 1 depicts a schematic view of an exemplary vehicle equipped with a typical vehicle control module and sensor configuration.

A typical vehicle control module and sensor configuration is depicted in FIG. 1, on a four cylinder engine 11. The vehicle 7 depicted is naturally aspirated, with air flowing through an air filter 16, then a throttle body 18, before flowing through an intake manifold 17 and entering the engine 11. A combined air sensor 9 reads the mass, pressure, and temperature of the incoming air and reports this to the factory vehicle control module 10; this works well in this configuration because the air does not significantly change temperature between the sensor 9 location and entering the engine 11.

Figure 2:
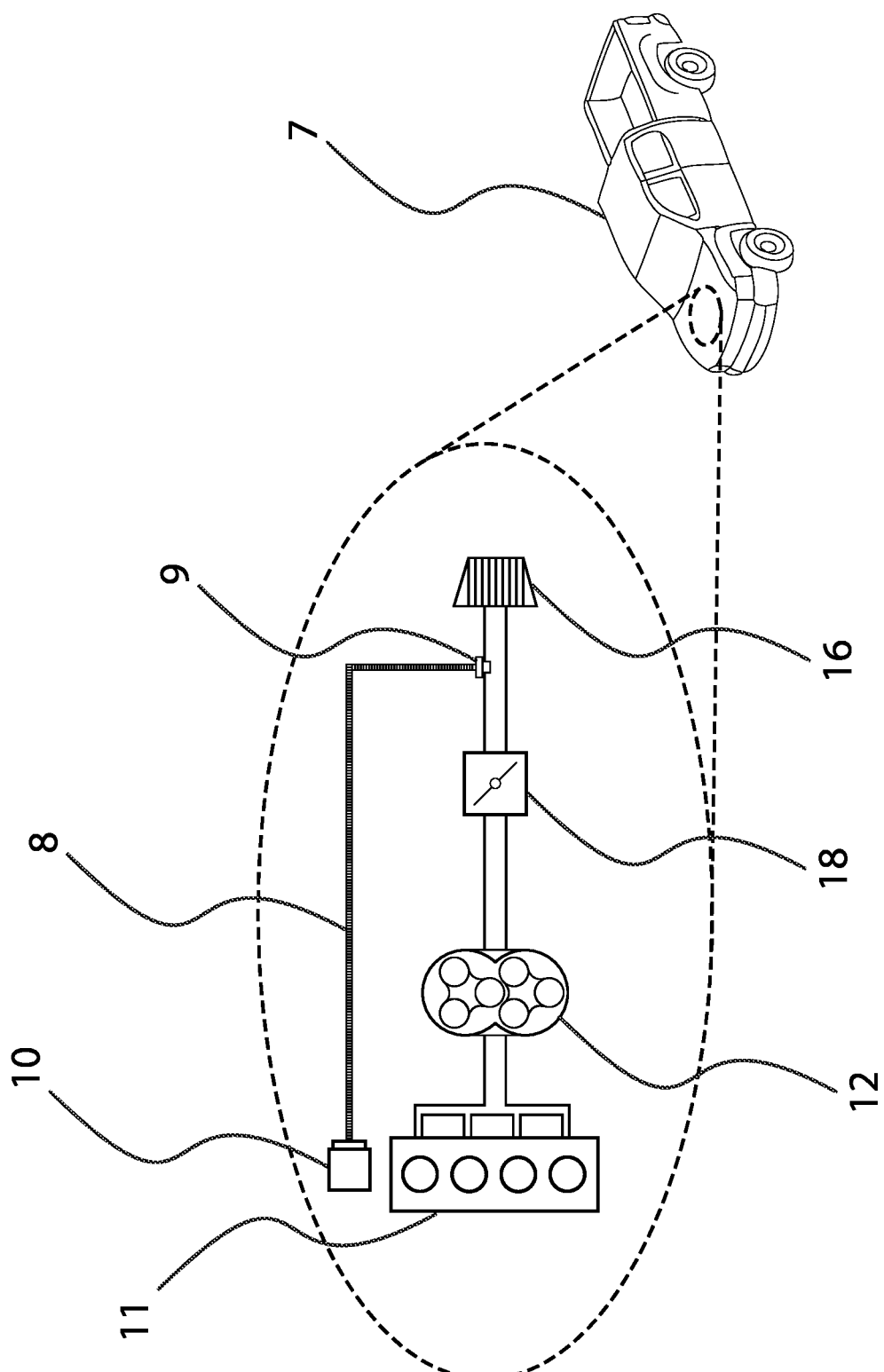
FIG. 2 depicts a schematic view of an exemplary vehicle that has been modified with an aftermarket supercharger assembly.

FIG. 2 depicts a vehicle 7 modified with an aftermarket supercharger assembly 12. The compressed intake air flowing from the supercharger assembly 12 is typically much hotter than the uncompressed air at the location of the combined air sensor 9, where the air temperature was measured and reported to the factory vehicle control module 10. As a result, the air sensor 9 is not providing the modified vehicle (with the supercharger 12) with accurate data.

Figure 3:
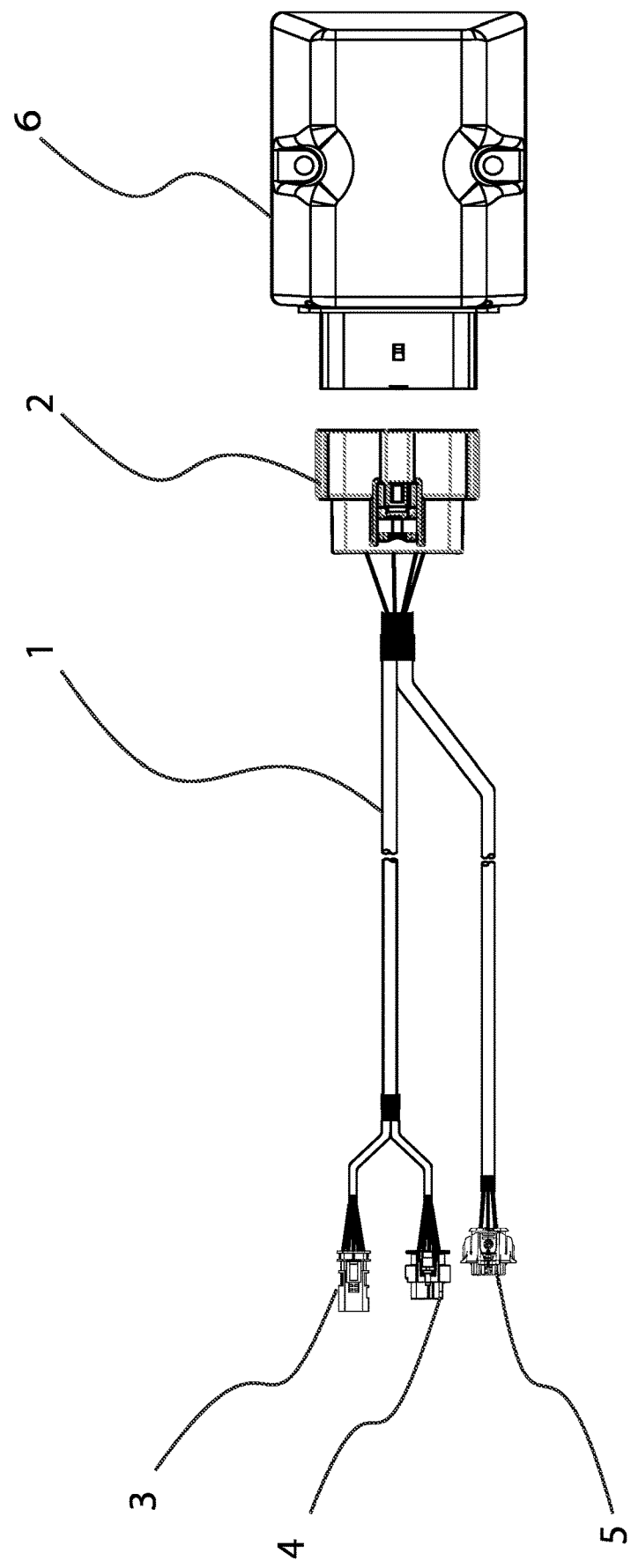
FIG. 3 depicts a schematic view of an exemplary breakout device with a Y-harness used to intercept and modify electrical communications between a factory vehicle control module and factory vehicle sensor.

As depicted in FIG. 3, a breakout device 6 typically includes various communications ports and connectors. For example, the breakout device 6 has a connector 3 that plugs into the original factory harness of the vehicle where a sensor has been disconnected, to allow the device 6 to be in electrical communication with the factory vehicle control module 10. The device 6 may also include a connector 4 that would attach to the original factory sensor 9, especially in embodiments where only a portion of the original sensor communications should be altered.

Figure 4:
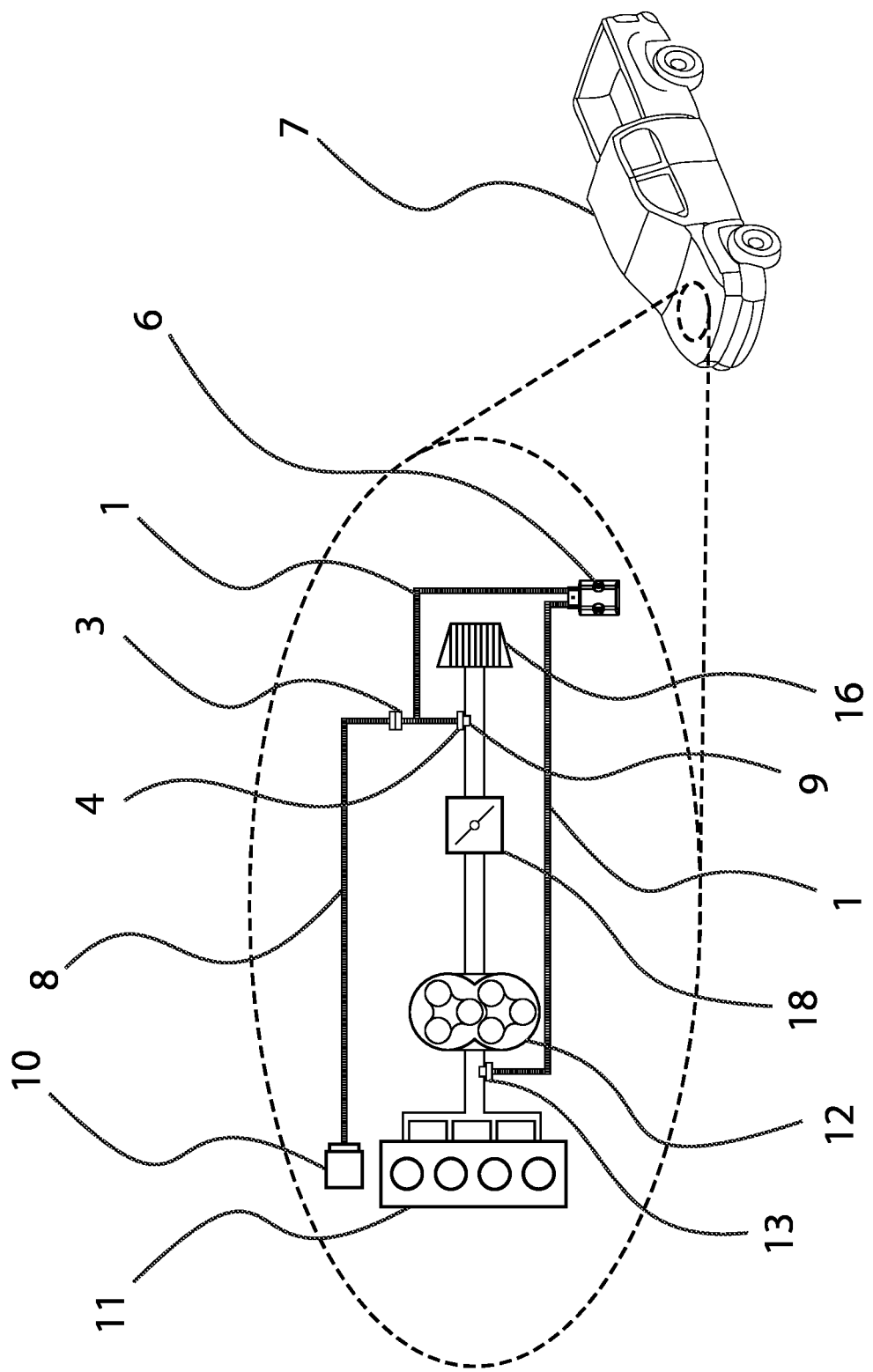
FIG. 4 depicts a schematic view of the vehicle of FIG. 2 showing an exemplary breakout device and an additional relocated air temperature sensor according to one embodiment of the present disclosure.

The present device 6 also allows a connector 5 to be used to attach a relocated aftermarket sensor 13 (see FIG. 4). In this embodiment, the device 6 may use readings from this sensor 13 to alter the communications from the factory vehicle sensor 9 to the vehicle control module 10. In other embodiments, the device 6 does not use a relocated vehicle sensor. The device may alter or generate communications based on various other factory sensor readings, user calculations, or other parameters.

As depicted in FIG. 4, according to one embodiment, the device 6 is connected between the factory vehicle control module 10 and the factory sensor 9 so that the factory signal readings, and other electrical communications, may be intercepted and modified by the device 6 before being received by the factory vehicle control module 10 and the factory sensor 9. In other embodiments, the factory sensor 9 is completely removed and the device 6 generates factory signal readings, and other electrical communications, which are received by the factory vehicle control module 10. Typically these generated factory signals are based on one or more relocated vehicle sensors or other factory sensor readings, user calculations, or other parameters. In this manner, the aftermarket breakout device 6 is able to simulate signal readings in place of the factory sensor 9 even though that sensor has been removed. In effect, the aftermarket breakout device 6 has become a multifunction sensor in this embodiment.

In typical embodiments, the factory, relocated, and generated signal readings, and corresponding electrical communications, comprise a pressure signal, a temperature signal, a humidity signal, a voltage signal, a speed signal, a position signal, a ratio signal, a percentage signal, a current/amperage signal, a resistance signal, a frequency signal, or other signal type.

According to one embodiment, the device 6 is connected between the factory vehicle control module 10 and a digital multifunction factory sensor 9 utilizing a digital protocol such as LIN (but could be CAN, SENT, or another digital protocol as is known in the art) to transmit or receive sensor and signal data, as well as unique identifiers, headers, counters, checksums, or other data, within separate digital protocol message frames. These message frames, containing signal readings or other communications, use unique message identifiers, usually defined using hexadecimal notation. For example, the hexadecimal value 10 (which is sometimes written as 0x10 or $10) would refer to the decimal number 16. Similarly, the hexadecimal values of 2A and 2B would refer to the decimal numbers 42 and 43 respectively. In one exemplary embodiment, the device 6 utilizes a unique message identifier hexadecimal 2A for digital protocol messages containing a throttle inlet pressure reading, a barometric pressure reading, a compressor inlet pressure reading, a manifold pressure reading, or a rolling counter, some of which have been modified using data values obtained from relocated sensor signal readings. Also in this exemplary embodiment, the device 6 utilizes unique message identifier hexadecimal 2B for digital protocol messages containing a intake air temperature reading, a humidity reading, or a rolling counter, some of which have been modified using data values obtained from relocated sensor signal readings In some embodiments, the factory vehicle control module 10 transmits the beginning of a digital protocol message frame, containing the unique identifier, and the device 6 transmits the remainder of the digital protocol message containing data, such as intake air temperature and barometric pressure, based on relocated sensor readings.

In most embodiments, the factory vehicle control module 10 is an Electronic Control Unit ("ECU"), which is an Engine Control Module, a Transmission Control Module, a Motor Control Module, a Fuel Control Module, an Injector Control Module, a Boost Control Module, a Battery Control Module, a Generator Control Module, a Brake Control Module, a Traction Control Module, a Stability Control Module, a Safety Control Module, a Body Control Module, a Chassis Control Module, or other vehicle control module type.

According to one embodiment, the device 6 is disconnected from the vehicle harness 12 and connected to a computer, laptop, smartphone, or tablet by way of the USB port on the device 6 or special USB harness attached to the device 6. According to other embodiments, the device 6 has wireless capability, or has a long communications cable 16, and thus need not be disconnected from the vehicle harness. After connecting the device 6 to a computer, laptop, smartphone, or tablet using a USB port or other communications method, the user may configure the device to accept various factory or relocated sensor configurations or data alterations. The device is then plugged back into the vehicle harness, where it operates using the updated configuration.

In some embodiments, the user may configure the device 6 to perform custom calculations, formulas, or algorithms to generate new data based on existing vehicle or peripheral input data. This new data can be additional to factory sensor data, can be used in place of factory sensor data, or can alter only a portion of factory sensor data.

In some embodiments, the device 6 can be removed from the vehicle and connected to an external computer (such as a desktop, laptop, tablet, smartphone, or other computing apparatus) for configuration purposes. One way to configure the device 6 involves connecting the device 6 to a laptop computer by way of a USB cable. Using these connection methods, a user may enter configuration information into, for example, an application running on the laptop, and the device 6 is then updated with the new configuration by passing the instructions over the USB cable.

In other embodiments, the device 6 can remain connected to the vehicle and concurrently connected to such a computer for configuration purposes. Typically, but not necessarily, the device 6 stops monitoring, communicating, or commanding the vehicle or aftermarket vehicle components while connected to such a computer. In other embodiments, the device 6 is configured with either a wired or wireless connection, thereby allowing that computer to communicate with the device 6 or the vehicle in a bidirectional manner.

The device 6 may include peripheral input ports or harness connectors for obtaining data from external sources. Data from these external sources may be configured or used to further modify electrical communications to a factory vehicle control module 10. In some embodiments, these external sources may control communications in their entirety.

In one embodiment, the device 6 connects to multiple separate, distinct, and different communications systems (or data buses) on the vehicle data, typically using differing pins on a vehicle harness connector, or separate vehicle harness connectors completely. The device 6 may then send communications to, and read vehicle operating parameters and conditions from, multiple vehicle electronic control modules or sensors across several data buses 15. The device can then alter these communications as required according to the device's current configuration and relocated sensor attachments.

The device 6 typically monitors one or multiple vehicle operating parameters and conditions comprising such items as:

1-2 Shift Time,
12V Battery Estimated Temperature,
12V Circuit Current,
12V Circuit Temperature,
12V Circuit Voltage,
12V Conditions Met,
12V Enable Command,
2-3 Shift Time,
300V AC Isolation Status,
300V Charge Command,
300V DC Isolation Status,
300V Isolation Test Status,
3-4 Shift Time,
42V Circuit Current,
42V Circuit Maximum,
42V Circuit Temperature Status,
42V Circuit Temperature,
42V Circuit Voltage,
42V Enable Command,
4-5 Shift Time,
4WD Low Signal,
4WD Low,
4WD Signal,
4WD,
5 Volt Reference 1 Circuit Status,
5 Volt Reference 2 Circuit Status,
5 Volt Reference,
5-6 Shift Time,
A/C Clutch,
A/C Compressor Cycling Switch,
A/C High Side Pressure Sensor,
A/C High Side Pressure Switch,
A/C High Side Pressure,
A/C Mode Request Signal,
A/C Off for WOT,
A/C Pressure Disable,
A/C Relay Command,
A/C Request Signal,
A/C system refrigerant monitoring status,
ABS Active,
Accelerator Pedal Position Angle,
Accelerator Pedal Position,
Actual Engine-Percent Torque,
Air Flow Calculated,
Air Flow Rate/Mass Air Flow,
Air Fuel Ratio,
air/fuel ratio or lambda,
Alcohol Fuel Percentage,
all-wheel drive,
Ambient Air Temperature,
APM Voltage,
APP Indicated Angle,
APP Sensor Indicated Position,
Auto Start/Stop Fault,
Auto Start/Stop Override,
Auto Trans Neutral Drive Status,
Auxiliary Power Module 300V Circuit Current,
Auxiliary Power Module Heat Rate Temperature,
Auxiliary Power Module Power Loss,
Auxiliary Power Module Set Point,
Auxiliary Transmission Fluid Pump Actual,
Auxiliary Transmission Fluid Pump Command,
Auxiliary Transmission Fluid Pump Commanded,
Auxiliary Transmission Fluid Pump Fault Status,
Auxiliary Transmission Fluid Pump Relay,
Axle Torque Actual,
Axle Torque Commanded,
Axle Torque Immediate,
Barometer,
Barometric Pressure,
Battery Voltage Signal,
Battery voltage,
BECM HVIC Status,
BECM Maximum Voltage,
BECM Minimum Voltage,
Boost pressure system monitoring status,
BPP Circuit Signal,
BPP Signal,
Brake Booster Pressure Sensor,
Brake Booster Pressure,
Brake Pedal Pressed,
Brake Pedal Status,
Brake Pressure Sensor,
Brake Temp Status,
braking,
Calculated Hybrid Battery Current,
Calculated Hybrid Battery Resistance,
Calculated Hybrid Battery Voltage,
Calculated Starter Generator Torque,
Calculated Throttle Position,
Catalyst monitoring status,
Catalyst Temperature,
Catalytic Control Status,
Catalytic Converter Protection Active,
Catalytic Converter Protection,
Change Engine Oil Indicator Command,
CKP Active Counter,
CKP Resync Counter,
CKP Variation Learn Attempts,
Clutch Start Switch,
CMP Active Counter,
CMP Command,
CMP Sensor,
Cold Startup,
Commanded Gear,
Commanded Throttle Actuator Control,
Comprehensive component monitoring status,
Compression ignition monitoring status,
Contactor System Open Reason,
Contactor System Required Ckt Command,
Contactor System Required Signal,
Contactor System Requirement Ckt. Command,
Contactor System Status,
Control Module Voltage Signal,
Control module voltage,
Cooling Fan Command,
Cooling Fan Motor Commanded, CPP Switch,
Crank Request Signal,
Cruise Control Active,
Cruise Disengage 1 History,
Cruise Disengage 2 History,
Cruise Disengage 3 History,
Cruise Disengage 4 History,
Cruise Disengage 5 History,
Cruise Disengage 6 History,
Cruise Disengage 7 History,
Cruise Disengage 8 History,
Cruise On/Off Switch,
Current Gear,
Cycles of Misfire Data,
Cylinder Deactivation Performance Test,
Cylinder Deactivation System Command,
cylinder firing order,
Deactivation Inhibit APP High,
Deactivation Inhibit APP Rate High,
Deactivation Inhibit Axle Torque Limiting,
Deactivation Inhibit Brake Boost Pressure Sensor DTC,
Deactivation Inhibit Cylinder Deactivation Solenoid DTC,
Deactivation Inhibit Engine Coolant Temperature Low,
Deactivation Inhibit Engine Coolant Temperature Sensor DTC,
Deactivation Inhibit Engine Oil Pressure Sensor DTC,
Deactivation Inhibit Engine Oil Pressure,
Deactivation Inhibit Engine Oil Temperature,
Deactivation Inhibit Engine Overtemperature Protection,
Deactivation Inhibit Engine RPM,
Deactivation Inhibit Hot Coolant Mode,
Deactivation Inhibit Low Brake Booster Vacuum,
Deactivation Inhibit Manifold Vacuum Low,
Deactivation Inhibit MAP Sensor DTC,
Deactivation Inhibit Maximum Deactivation Time Exceeded,
Deactivation Inhibit Minimum Time On All Cylinders,
Deactivation Inhibit Oil Aeration,
Deactivation Inhibit Piston Protection,
Deactivation Inhibit TAC Ignition Voltage,
Deactivation Inhibit TAC System DTC,
Deactivation Inhibit Torque Reduction,
Deactivation Inhibit Transmission DLC Override,
Deactivation Inhibit Transmission Gear,
Deactivation Inhibit Transmission Range,
Deactivation Inhibit Transmission Shifting,
Deactivation Inhibit TWC Overtemperature Protection,
Deactivation Inhibit Vehicle Speed Sensor DTC,
Deactivation Inhibit Vehicle Speed Sensor Low with Torque Converter Clutch On,
Deceleration Fuel Cutoff,
Desired APM Voltage,
Desired Exh. CMP,
Desired Fan Speed,
Desired Fuel Rail Pressure,
Desired Hybrid Battery SoC,
Desired Idle Speed,
Desired Int. CMP,
Desired Starter Gen Torque,
DFCO Active Time,
Diagnostic Trouble Code Count,
Diagnostic Trouble Code Status,
Diagnostic Trouble Codes (DTCs),
Direction IMS D1,
Direction IMS D2,
Direction IMS R1,
Direction IMS R2,
Direction IMS S,
Direction IMS,
Distance since diagnostic trouble codes cleared,
Distance Since DTC Failure,
Distance Since First Failure,
Distance Since Last Failure,
Distance Travelled While MIL is Activated,
Distance with Cylinders Activated,
Distance with Cylinders Deactivated,
DMCM Cint. Pump 1 Command,
DMCM Cint. Pump 1 Open Test Status,
DMCM Cint. Pump 1 Short to Ground Test Status,
DMCM Cint. Pump 1 Short to Voltage Test Status,
DMCM Coolant Temperature,
Driver Axle Torque Request,
Driver Seat Belt Switch,
Driver Seat Position Sensor,
Driver Shift Control,
Driver Shift Request,
Driver's Demand Engine-Percent Torque,
Driving cycle status,
DRP Active,
DRP Disabled,
Driver Axle Torque Request,
DTC that caused required freeze frame data storage,
EC Ignition Command,
EC Ignition Relay Feedback Signal,
ECM Challenge Status,
ECM Des. Contactor Position,
ECM Fault,
ECM Request,
Economy Lamp Command,
EGR Status,
EGR system monitoring status,
Emission requirements to which vehicle is designed,
Emissions monitor status,
Engine Auto Start Times,
Engine Coolant Circulation Pump Relay Command,
Engine Coolant Temperature,
Engine Fuel Rate,
Engine Load,
Engine Off EVAP Test Conditions Met,
Engine Oil Indicator Command,
Engine Oil Level Switch,
Engine Oil Life Remaining,
Engine Oil Pressure Sensor,
Engine Oil Pressure Switch,
Engine Oil Temperature,
Engine Percent Torque At Idle,
Engine Percent Torque,
Engine Reference Torque,
Engine RPM,
Engine Run Time,
engine timing,
Engine Torque Actual,
Engine Torque Commanded,
Engine Torque,
EVAP Purge Solenoid Command,
EVAP Vent Solenoid Command,
Evaporative Purge Status,
Evaporative system monitoring status,
Evaporative System Vapor Pressure,
Exh. CMP Variance,
Exh. CMP Active Counter,
Exh. CMP Angle,
Exh. CMP Command, Exhaust gas sensor monitoring status,
Exhaust Pressure,
External Travel BPP Signal,
Fail Counter,
Fan Speed,
FC Relay Command,
four-wheel drive,
fuel economy,
fuel flow rate,
Fuel Injection Timing,
Fuel Injector Disabled Due to Misfire,
Fuel Injector Status,
Fuel Level Remaining,
Fuel Level Sensor,
Fuel Level,
fuel pressure,
Fuel Pump Command,
Fuel Pump Current,
Fuel Pump Driver Input Duty cycle,
Fuel Pump Driver Input Frequency,
Fuel Pump Driver Output Duty Cycle,
Fuel Pump Driver Temperature,
Fuel Pump Operating Status,
Fuel Pump Relay 2 Command,
Fuel Pump Relay Command,
Fuel Pump Signal Command,
Fuel Pump Speed,
Fuel Rail Pressure relative to manifold vacuum,
Fuel Rail Pressure Sensor,
Fuel Rail Pressure,
Fuel Sensor Right Tank,
Fuel Status,
Fuel system monitoring status,
Fuel system status,
Fuel Tank Pressure Sensor,
Fuel Tank Pressure,
Fuel Tank Rated Capacity,
Fuel Trim Average,
Fuel Trim Cell,
Fuel Trim Learn,
Fuel Trim Test Average without Purge,
Fuel Trim Test Average,
Fuel Trim,
Fuel type,
Fuel/Air Commanded Equivalence Ratio (lambda),
gear position,
Gear Ratio,
Gen L-Terminal Signal Command,
Gen L-Terminal Signal Command,
GEN L-Terminal Signal,
Generator F-Terminal Signal,
Generator L-Terminal Command,
Generator Starter Field Current,
Generator Starter Rotor Position,
Glow Plug Lamp Status,
GPS position information,
Heated catalyst monitoring status,
Heated Oxygen Sensor Command,
Heated Oxygen Sensor Heater,
Heated Oxygen Sensor Status,
Hill Hold Indicator Command,
Hill Hold Solenoid 1,
Hill Hold Solenoid 2,
HO2S 1 Heater Command,
HO2S 2 Heater Command,
HO2S Bank 1 Sensor 1 Heater Command,
HO2S Bank 1 Sensor 2 Heater Command,
HO2S Bank 2 Sensor 1 Heater Command,
HO2S Bank 2 Sensor 2 Heater Command,
Hood Open Indicator Command,
Hot Open Loop,
HPCM 300V Circuit,
HPCM Authentication Status,
HPCM HVIC Status,
HPCM Response Source,
HPCM/ECM Challenge Status,
HVIC Return Current,
HVIC Source Current,
Hybrid System,
Hybrid Battery 1,
Hybrid Battery 2,
Hybrid Battery 3,
Hybrid Battery 4,
Hybrid Battery 5,
Hybrid Battery 6,
Hybrid Battery 7,
Hybrid Battery 8,
Hybrid Battery 9,
Hybrid Battery 10,
Hybrid Battery 11,
Hybrid Battery 12,
Hybrid Battery 13,
Hybrid Battery 14,
Hybrid Battery 15,
Hybrid Battery 16,
Hybrid Battery 17,
Hybrid Battery 18,
Hybrid Battery 19,
Hybrid Battery 20,
Hybrid Battery Average Cell Temperature,
Hybrid Battery Cumulative Charge Amp Hours,
Hybrid Battery Cumulative Discharge Amp Hours,
Hybrid Battery Current Sensor,
Hybrid Battery Current,
Hybrid Battery Discharge Power Available,
Hybrid Battery High Current Sensor,
Hybrid Battery Inlet Air Temperature Sensor,
Hybrid Battery Inlet Air Temperature,
Hybrid Battery Low Current Sensor,
Hybrid Battery Max Cell Temperature,
Hybrid Battery Min Cell Temperature,
Hybrid Battery Mod 1 Temperature Sensor,
Hybrid Battery Mod 1 Temperature,
Hybrid Battery Mod 2 Temperature Sensor,
Hybrid Battery Mod 2 Temperature,
Hybrid Battery Mod 3 Temperature Sensor,
Hybrid Battery Mod 3 Temperature,
Hybrid Battery Mod 4 Temperature Sensor,
Hybrid Battery Mod 4 Temperature,
Hybrid Battery Mod 5 Temperature Sensor,
Hybrid Battery Mod 5 Temperature,
Hybrid Battery Mod 6 Temperature Sensor,
Hybrid Battery Outlet Air Temperature Sensor,
Hybrid Battery Outlet Air Temperature,
Hybrid Battery Pack Calculated,
Hybrid Battery Pack Fan Commanded,
Hybrid Battery Pack Fan Sensor,
Hybrid Battery Pack Fan Speed,
Hybrid Battery Pack Power,
Hybrid Battery Pack Remaining Charge,
Hybrid Battery Pack Voltage,
Hybrid Battery Power Available,
Hybrid Battery SoC,
Hybrid Battery Terminal, Hybrid Battery Voltage,
Hybrid Motor 1 Current Commanded,
Hybrid Motor 1 Phase U Current,
Hybrid Motor 1 Phase V Current,
Hybrid Motor 1 Phase W Current,
Hybrid Motor 1 Resolver Angle,
Hybrid Motor 1 Resolver Offset,
Hybrid Motor 1 Speed Actual,
Hybrid Motor 1 Temperature Sensor,
Hybrid Motor 1 Temperature,
Hybrid Motor 1 Torque Actual,
Hybrid Motor 1 Torque Commanded,
Hybrid Motor 2 Current Commanded,
Hybrid Motor 2 Phase U Current,
Hybrid Motor 2 Phase V Current,
Hybrid Motor 2 Phase W Current,
Hybrid Motor 2 Resolver Angle,
Hybrid Motor 2 Resolver Offset,
Hybrid Motor 2 Speed Actual,
Hybrid Motor 2 Temperature Sensor,
Hybrid Motor 2 Temperature,
Hybrid Motor 2 Torque Actual,
Hybrid Motor 2 Torque Commanded,
Hybrid System Voltage,
Hybrid Transmission Mode Actual,
Hybrid Transmission Mode Commanded,
ICE Cranking Speed Commanded,
ICE Cranking Status,
ICE Status,
Ignition Accessory Signal,
Ignition Crank,
Ignition Off Time,
Ignition Timing Advance,
ignition timing or spark advance,
Ignition Voltage Signal,
Ignition Voltage,
IMS Range,
Initial Brake Signal,
Injector Pulse Width,
Int. CMP Variance,
Int. CMP Active Counter,
Int. CMP Angle,
Int. CMP Command,
Intake Air Temperature,
Intake Manifold Pressure,
Isolation Test Resistance,
ISS/OSS Supply Voltage,
Knock Detected,
Knock Retard,
KS Active Counter,
Last Shift Time,
Lateral Accelerometer Signal,
Left Front Inlet ABS Solenoid,
Left Front Outlet ABS Solenoid,
Left Front Wheel Speed,
Left Rear Inlet ABS Solenoid,
Left Rear Outlet ABS Solenoid,
Left Rear Wheel Speed,
Left TCS Isolation Solenoid Command,
Left TCS Prime Solenoid Command,
Long Term Fuel Pump Trim,
Long Term Fuel Trim,
Loop 1 Type,
Loop 2 Type,
Loop 3 Type,
Loop 4 Type,
Loop 5 Type,
Loop 6 Type,
Loop 7 Type,
Loop 8 Type,
Loop 9 Type,
Loop 10 Type,
Loop 11 Type,
Loop 12 Type,
Loop Status,
Low Engine Oil Level Indicator Command,
Low Engine Oil Pressure Indicator Command,
MAF Performance Test,
MAF Sensor,
Malfunction Indicator Lamp (MIL) Status,
manifold pressure,
Manual Trans Neutral Gear Status,
MAP Performance Test 1,
MAP Performance Test 2,
MAP Sensor,
Mass Air Flow Sensor Status,
mass air flow,
Maximum Hybrid Battery Module Voltage,
MIL Command,
MIL Requested By DTC,
Minimum Hybrid Battery Module Voltage,
Minutes run by the engine while MIL activated,
Misfire Current,
Misfire History,
Misfire monitoring status,
NMHC catalyst monitoring status,
Non-Driven Wheel Speed,
Not Run Counter,
NOx aftertreatment monitoring status,
Number of warm-ups since diagnostic trouble codes cleared,
On Board Diagnostic System Type,
Output Shaft Speed,
Oxygen Sensor Current,
Oxygen Sensor Equivalence Ratio (lambda),
Oxygen Sensor Fuel Trim,
Oxygen sensor heater monitoring status,
Oxygen Sensor Location,
Oxygen sensor monitoring status,
Oxygen Sensor Status,
Oxygen Sensor Voltage,
Parking Brake Status,
Pass Counter,
Passenger Seat Belt Switch,
Passenger Seat Position Sensor,
PC Solenoid 1 CKT Status,
PC Solenoid 1 Line Pressure Command,
PC Solenoid 2 CKT Status,
PC Solenoid 2 Line Pressure Command,
PC Solenoid 3 CKT Status,
PC Solenoid 3 Line Pressure Command,
PC Solenoid 4 CKT Status,
PC Solenoid 4 Line Pressure Command,
PC Solenoid 5 CKT Status,
PC Solenoid 5 Line Pressure Command,
PCM/VCM in VTD Fail Enable,
Phase U Current Offset,
Phase U Inverter Temperature,
Phase V Current Offset,
Phase V Inverter Temperature,
Phase W Current Offset,
Phase W Inverter Temperature,
PM filter monitoring status,
PNP Switch, Power Enrichment,
Power Take Off (PTO) Status,
Power Take Off,
Primary Key Status,
PTO Remote Start Request Signal,
Pump Motor Relay Commanded,
Pump Motor Relay Feedback,
Received Primary Key,
Reduced Engine Power,
Regen. Brake Torque Predicted,
Regen. Brake Torque Request,
Resolver Learned,
Right Front Inlet ABS Solenoid,
Right Front Outlet ABS Solenoid,
Right Front Wheel Speed,
Right Rear Inlet ABS Solenoid,
Right Rear Outlet ABS Solenoid,
Right Rear Wheel Speed,
Right TCS Isolation Solenoid Command,
Right TCS Prime Solenoid Command,
Rollover Sensor,
Rough Road Detected,
Run/Crank,
Run/Crank Mode,
Secondary Air Status,
Secondary air system monitoring status,
Secondary Key Status,
Secondary Oxygen Sensor Current,
Secondary Oxygen Sensor Equivalence Ratio (lambda),
Secondary Oxygen Sensor Fuel Trim,
Secondary Oxygen Sensor Location,
Secondary Oxygen Sensor Status,
Secondary Oxygen Sensor Voltage,
Sensor 1 Type,
Sensor 2 Type,
Sensor 3 Type,
Sensor 4 Type,
Sensor 5 Type,
Sensor 6 Type,
SGCM 12 Volt Converter,
SGCM Converter Temperature,
SGCM Des. Contactor Position,
SGCM Internal Temperature,
SGCM Inverter Temperature,
Shift Solenoid 1,
Shift Solenoid 2,
Short Term Fuel Pump Trim,
Short Term Fuel Trim,
SIR Warning Indicator,
Skip Shift Lamp Command,
Skip Shift Solenoid Command,
Solenoid Relay Commanded,
Solenoid Relay Feedback,
Starter Generator Belt Slip,
Starter Generator Speed,
Starter Relay Command,
Startup IAT,
Startup Intake Air Temperature,
Steering Wheel Angle,
Switched Battery Voltage Signal,
System Voltage,
TAC Forced Engine Shutdown,
TAC Motor Command,
TAC Motor,
TB Idle Airflow Compensation,
TCC Brake Switch,
TCC PC Solenoid Pressure Command,
TCC Slip Speed,
TCC/Cruise Brake Pedal Switch,
TCS Active,
TCS Enabled,
TCS Torque Delivered Signal,
TCS Torque Request Signal,
TFP Switch 1,
TFP Switch 2,
TFP Switch 3,
TFP Switch 4,
TFP Switch 5,
Throttle Position,
Time since diagnostic trouble codes cleared,
Time Since Engine Start,
Torque Delivered Signal,
Torque Management Spark Retard,
Torque Request Inhibit-Fuel,
Torque Request Inhibit-Minimum Idle Inhibit,
Torque Request Inhibit-Minimum Torque,
Torque Request Inhibit-Spark Advance,
Torque Request Inhibit-Spark,
Torque Request Inhibit-TAC Limit,
Torque Request Inhibit-TAC,
Total Brake Torque,
Total Misfire,
TP Desired Angle,
TP Indicated Angle,
TP Performance Test,
TP Sensor 1 Learned Minimum,
TP Sensor 2 Learned Minimum,
TP Sensor Indicated Position,
TP Sensors 1 and 2,
Traction Control Status,
trailer brake status,
Transfer Case OSS,
Transfer Case Ratio,
Transmission Fluid Temperature,
Transmission Full Feed Fill Pressure,
Transmission Input Shaft Speed,
Transmission Output Shaft Speed,
transmission status,
Transmission Switch,
Turbine Speed,
TWC Mon. Bank 1 Test Count,
TWC Mon. Bank 2 Test Count,
TWC Temperature Calculated,
Vacuum Calculated,
vehicle location,
Vehicle Speed Circuit 2 Status,
Vehicle Speed Circuit Status,
Vehicle Speed,
VES Actuator Command,
VES Actuator Feedback,
VES Failed,
VSES Active,
VSES Enabled,
VSES is Centered,
VTD Auto Learn Counter,
VTD Auto Learn Timer Active,
VTD Auto Learn Timer,
VTD Fuel Disable Until Ignition Off,
VTD Fuel Disable,
VTD Fuel Enabled,
VTD Password Learn Scan Tool Delay,
VTD Password Learn Enabled,
VTD Password Learned,
VTD Security Code Accepted, VTD Security Code Lockout,
VTD Security Code Programmed,
VTD Security Info Programmed,
VTD Security Information Programmed,
VTD System Status,
VVT system monitoring status,
Warm-ups w/o Emission Faults,
Warm-ups w/o Non-Emission Faults,
Warm-Ups without Emission Faults,
Warm-Ups without Non-Emission Faults,
Wide Open Throttle, and
Yaw Rate Signal.

In some embodiments, the device 6 allows the vehicle operator or other user to introduce new data by way of custom calculations using vehicle operating parameters, or vehicle condition data obtained from a vehicle data port 14 as well as sensor readings or other data obtained using sensors on the device itself or from a peripheral port or harness connector. The device 6 allows a vehicle operator or other user to further configure the device 6 operation or behavior using this new data.

Figure 5:
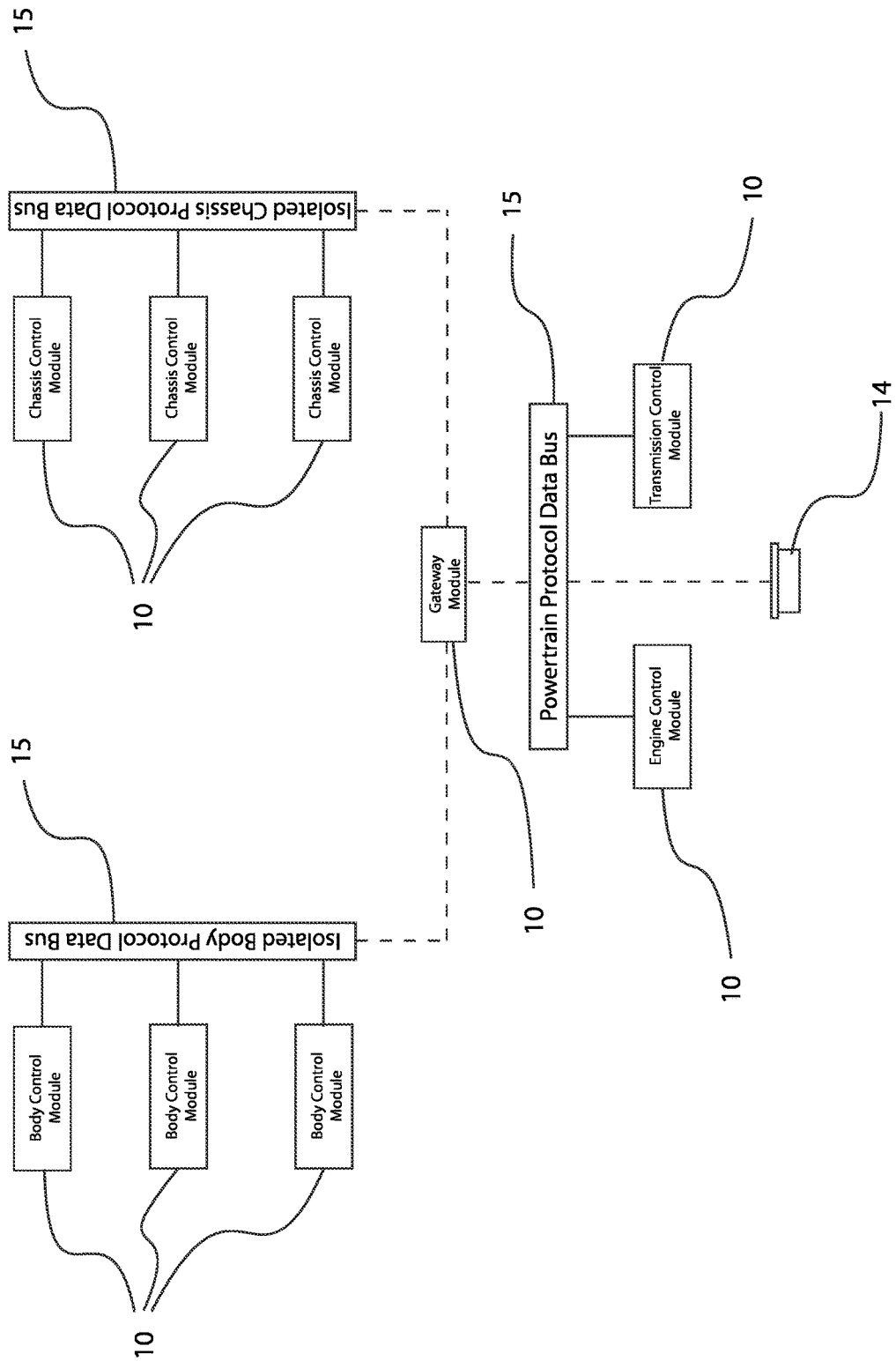
FIG. 5 depicts a schematic view of an exemplary vehicle protocol data bus wiring layout according to one embodiment of the present disclosure.

As depicted in FIG. 5, in some embodiments the vehicle 7 may incorporate multiple vehicle protocol data buses 15, gateway modules 10, body control modules 10, chassis control modules 10, engine and/or transmission control modules 10, or other vehicle electronic control modules 10. Some of those vehicle protocol data buses 15 may be isolated vehicle protocol data buses, while others may be accessible through a data port 14. As depicted in FIG. 5, typically the gateway module 10 connects to the data port 14 through the data buses 15, but other configurations are also possible. The breakout device 6 may connect to a single data bus, or a multitude of data buses, to or from various modules or sensors to read vehicle operating parameters.

Thus, the present system has several advantages over the prior art. Although the foregoing description contains many specifics, these are not to be construed as limiting the scope of the present disclosure, but merely as providing certain embodiments. Similarly, other embodiments of the invention may be devised that do not depart from the scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

The invention claimed is:

1. A system for modifying a vehicle sensor signal comprising:
   a breakout device placed in wired or wireless electrical communication between a first vehicle sensor and a first vehicle ECU, and further configured to be in electrical communication with a second vehicle sensor;
   wherein the first vehicle sensor is configured to transmit a plurality of different types of signal readings using a vehicle communications protocol, via electrical communications originally intended, at least in part, for the first vehicle ECU;
   the breakout device being configured for viewing, intercepting, and modifying the electrical communications going between the first vehicle sensor and the first vehicle ECU;
   wherein the second vehicle sensor has been installed in a different location or sensing position relative to the first vehicle sensor and transmits one or more types of signal readings via electrical communications to the breakout device;
   wherein the breakout device modifies the electrical communications going between the first vehicle sensor and the first vehicle ECU;
   wherein the modified electrical communications include replacing at least one of the plurality of signal readings, using the signal readings received via electrical communications from the second vehicle sensor; and
   wherein the modified electrical communications keep at least one other of the plurality of signal readings from the first vehicle sensor in its original unmodified form.

2. A system for replacing a vehicle sensor comprising:
   a breakout device placed in wired or wireless electrical communication with a first vehicle ECU;
   wherein the breakout device replaces a first vehicle sensor that was originally in electrical communication with the first vehicle ECU, but has been removed;
   wherein the first vehicle sensor transmitted a plurality of different types of signal readings using a vehicle communications protocol, via electrical communications originally intended, at least in part, for the first vehicle ECU;
   the breakout device configured to be in electrical communication with a second vehicle sensor and a third vehicle sensor;
   wherein the second vehicle sensor has been installed in a different location or sensing position relative to the first vehicle sensor's original location and the second vehicle sensor transmits one or more different types of signal readings, via electrical communications to the breakout device;
   wherein the third vehicle sensor has been installed in a different location or sensing position relative to the first vehicle sensor's original location and the third vehicle sensor transmits one or more different types of signal readings, via electrical communications to the breakout device;
   the breakout device being capable of generating signal readings;
   wherein the generated signal readings are based, at least in part, on the signal readings from both the second vehicle sensor and the third vehicle sensor; and
   the breakout device transmits the generated signal readings to the first vehicle ECU so that the first vehicle ECU receives the generated signal readings in place of the originally intended electrical communications that would have been transmitted by the first vehicle sensor.

3. The system of claim 1 or claim 2 wherein the breakout device and the second vehicle sensor are contained within a single electronics enclosure.

4. The system of claim 1 or claim 2 wherein the signal readings transmitted by the second vehicle sensor comprise one or more of:
   a pressure signal;
   a temperature signal;
   a humidity signal;
   a voltage signal;
   a speed signal;
   a position signal;
   a ratio signal;
   a percentage signal;
   a current/amperage signal;
   a resistance signal; or
   a frequency signal.

5. The system of claim 2 wherein the signal readings transmitted by the third vehicle sensor comprise one or more of:
   a pressure signal;
   a temperature signal;
   a humidity signal;
   a voltage signal;
   a speed signal;
   a position signal;
   a ratio signal;
   a percentage signal;
   a current/amperage signal;
   a resistance signal; or
   a frequency signal.

6. A system for generating a vehicle sensor signal comprising:
   a breakout device configured to generate signal readings for a plurality of different types of signals using a vehicle communications protocol, the breakout device being in wired or wireless electrical communication with a first vehicle ECU in place of a first vehicle sensor, such that the breakout device is the first vehicle sensor for the first vehicle ECU;
   wherein the first vehicle ECU is configured to receive a plurality of different types of signal readings using a vehicle communications protocol, via electrical communications originating from the first vehicle sensor;
   the breakout device further configured to collect vehicle operating parameters or other data by way of one or more additional data sources, the one or more additional data sources being one or more of a peripheral input, an analog input, a digital input, RF signal input, or a connection to a vehicle protocol data bus;
   wherein the breakout device monitors the vehicle operating parameters or other data from the one or more additional data sources, and the breakout device generates a plurality of different types of signal readings based, at least in part, on the monitored vehicle operating parameters or other data; and
   the breakout device further configured to transmit the generated signal readings to the first vehicle ECU as the first vehicle sensor.

7. The system of claim 1 or claim 2 or claim 6 wherein the first vehicle ECU is one of:
   an Engine Control Module;
   a Transmission Control Module;
   a Motor Control Module;
   a Fuel Control Module;
   an Injector Control Module;
   a Boost Control Module;
   a Battery Control Module;
   a Generator Control Module;
   a Brake Control Module;
   a Traction Control Module;
   a Stability Control Module;
   a Safety Control Module;
   a Body Control Module; or
   a Chassis Control Module.

8. The system of claim 1 or claim 2 or claim 6 wherein the signal readings transmitted by the first vehicle sensor comprise one or more of:
   a pressure signal;
   a temperature signal;
   a humidity signal;
   a voltage signal;
   a speed signal;
   a position signal;
   a ratio signal;
   a percentage signal;
   a current/amperage signal;
   a resistance signal; or
   a frequency signal.

9. The system of claim 1 or claim 2 or claim 6 wherein the breakout device modifies electrical communications going between one or more additional vehicle sensors and either the first vehicle ECU or one or more additional vehicle electronic control units (ECUs) and wherein the modified electrical communications are received instead of the originally transmitted electrical communications.

10. The system of claim 1 or claim 2 or claim 6 wherein the breakout device is in electrical communications with a plurality of additional vehicle sensors that collectively have a plurality of additional types of signal readings, and wherein the breakout device modifies electrical communications going to the first vehicle ECU or one or more additional vehicle electronic control units (ECUs), based at least in part on the plurality of additional types of signal readings.

11. The system of claim 1 or claim 2 or claim 6 wherein the modified electrical communications utilize one or more of:
   a CAN protocol;
   a LIN protocol;
   a SENT protocol;
   a J1850 protocol;
   a MOST protocol;
   a UART protocol;
   an I2C protocol;
   an SPI protocol;
   an Ethernet protocol;
   an RF signal;
   a voltage signal;
   a current/amperage signal;
   a resistance signal; or
   a frequency signal.

12. The system of claim 1 or claim 2 or claim 6 wherein the electrical communications are comprised of one or more digital protocol messages wherein each digital protocol message is transmitted in a separate message frame, and contains one or more of message headers, message data, message counters, sensor data, signal data, checksums, or other data;
   the digital protocol messages utilizing a unique message identifier according to the message headers, message data, message counters, sensor data, signal data, checksums, or other data contained therein;
   the unique message identifier being transmitted along with, or as part of, each message frame; and
   the breakout device being capable of transmitting, to either a vehicle sensor or a vehicle ECU, modified digital protocol messages containing different or modified message headers, message data, message counters, sensor data, signal data, checksums, or other data.

13. The system of claim 12 wherein digital protocol messages use a unique message identifier value of hexadecimal 2A for digital protocol messages containing, at least in part, one or more of:
   a throttle inlet pressure data value;
   a barometric pressure data value;
   a compressor inlet pressure data value;
   a manifold pressure data value; or
   a rolling counter.

14. The system of claim 12 wherein digital protocol messages use a unique message identifier value of hexadecimal 2B for digital protocol messages containing, at least in part, one or more of:
- an intake air temperature data value;
- a humidity data value; or
- a rolling counter.

15. The system of claim 12 wherein a vehicle ECU transmits the beginning of a digital protocol message containing a unique message identifier and, within a predetermined time interval thereafter, the breakout device transmits the remainder of the digital protocol message containing data based, at least in part, on received signal readings.

\* \* \* \* \*